(12) United States Patent
Herrmann

(10) Patent No.: US 8,734,738 B1
(45) Date of Patent: May 27, 2014

(54) MOLTEN SALT EXTRACTION OF TRANSURANIC AND REACTIVE FISSION PRODUCTS FROM USED URANIUM OXIDE FUEL

(71) Applicant: Steven Douglas Herrmann, Idaho Falls, ID (US)

(72) Inventor: Steven Douglas Herrmann, Idaho Falls, ID (US)

(73) Assignee: U.S. Department of Energy, Washington, DC (US)

( * ) Notice: Subject to any disclaimer, the term of this patent is extended or adjusted under 35 U.S.C. 154(b) by 23 days.

(21) Appl. No.: 13/666,232

(22) Filed: Nov. 1, 2012

(51) Int. Cl.
*C22B 60/02* (2006.01)

(52) U.S. Cl.
USPC .................................................. 423/4; 423/5

(58) Field of Classification Search
None
See application file for complete search history.

(56) References Cited

U.S. PATENT DOCUMENTS

| 3,982,928 | A | * | 9/1976 | Chiotti et al. | .................... | 75/399 |
| 4,814,046 | A | * | 3/1989 | Johnson et al. | .................... | 205/47 |
| 5,141,723 | A | * | 8/1992 | Miller et al. | ....................... | 423/5 |

* cited by examiner

*Primary Examiner* — Steven Bos
(74) *Attorney, Agent, or Firm* — Michael J. Dobbs; Daniel Park; John T. Lucas

(57) ABSTRACT

Used uranium oxide fuel is detoxified by extracting transuranic and reactive fission products into molten salt. By contacting declad and crushed used uranium oxide fuel with a molten halide salt containing a minor fraction of the respective uranium trihalide, transuranic and reactive fission products partition from the fuel to the molten salt phase, while uranium oxide and non-reactive, or noble metal, fission products remain in an insoluble solid phase. The salt is then separated from the fuel via draining and distillation. By this method, the bulk of the decay heat, fission poisoning capacity, and radiotoxicity are removed from the used fuel. The remaining radioactivity from the noble metal fission products in the detoxified fuel is primarily limited to soft beta emitters. The extracted transuranic and reactive fission products are amenable to existing technologies for group uranium/transuranic product recovery and fission product immobilization in engineered waste forms.

25 Claims, 2 Drawing Sheets

Provided Declad and Crushed Uranium Oxide Fuel
Example: 33 GWd/MTU Burn-Up in Light Water Reactor and 10 year decay.
Typically Comprising, excluding oxygen, U 96.10%, TRU(Pu, Np, Am,Cm) 1.00%, group 1 (Cs, Rb) 0.27%, group 2 (Ba, Sr) 0.27%, group 3 (Y) 0.05%, lanthanides (Nd, Ce, La, Pr, Sm, Eu, Gd) - 1.02%, group 16 (Te, Se) - 0.05%, , group 17 (I, Br) - 0.03%, noble metals (Zr, Mo, Ru, Pd, Tc, Rh) - 1.22%

↓

Contact and Remove Fuel Particulate from Molten Salt Pool (Molten Salt Extraction)

↓

Remove Residual Salt from Fuel and Return to Molten Salt Pool (Salt Distillation)

↓

Fuel Make-Up after Molten Salt Extraction
Preferably, excluding oxygen, U 98.75%, noble metals (Zr, Mo, Ru, Pd, Tc, Rh) 1.25%

FIG. 2

MOLTEN SALT EXTRACTION OF TRANSURANIC AND REACTIVE FISSION PRODUCTS FROM USED URANIUM OXIDE FUEL

GOVERNMENT INTERESTS

The United States Government has rights in this invention pursuant to Contract No. DE-AC07-05ID14517, between the U.S. Department of Energy (DOE) and the Battelle Energy Alliance.

FIELD OF THE INVENTION

This invention relates generally to nuclear reactors used in the generation of power, and is particularly directed to the processing of used uranium oxide fuel from nuclear reactors.

BACKGROUND OF THE INVENTION

Molten salt systems are currently being used to treat used metal fuel from nuclear reactors. Indeed, an electrometallurgical treatment process has been developed by Argonne National Laboratory and is currently deployed at Idaho National Laboratory for the treatment of 25 MTHM (Metric Tons of Heavy Metal) of metal uranium and uranium alloy fuels from Experimental Breeder Reactor-II (EBR-II) and the Fast Flux Test Facility. In this process used, or spent, metal uranium alloy fuels are broken up, or chopped, and immersed in a molten salt electrolyte of LiCl—KCl—UCl$_3$ at 500° C. An electric potential is applied to anodically dissolve uranium metal from the used fuel and simultaneously deposit refined uranium metal on a solid cathode, from which the uranium metal fuel is recovered for reuse. In this electrorefining process, transuranic products, including Pu, Np, Am and Cm, and reactive fission product metals, including Cs, Rb, Ba, Sr, Y, Nd, Ce, La, Pr, Sm, Eu, and Gd, partition from the used fuel to the molten salt via exchange uranium trichloride per the following general reaction mechanism:

$$M + UCl_3 \rightarrow MCl_x + U \qquad (1)$$

where M=transuranic or reactive fission product metals.

Non-reactive, or noble metal, fission products, including Zr, Mo, Ru, Pd, Tc and Rh, remain with the undissolved cladding hulls at the anode, where they are subsequently removed and processed into a metallic waste form for disposal. Reactive non-metal fission products, including Te, Se, I and Br, diffuse into the electrorefining salt as anions. After sufficient accumulation in the electrorefining salt, transuranic constituents may be co-recovered with uranium using a liquid cadmium cathode to produce a group uranium/transuranic metal product. The remaining reactive fission products in the electrorefining salt (with or without the transuranic constituents) may be processed into an engineered ceramic waste form for disposal. The prescribed electrometallurgical treatment process is well suited for a metal fuel cycle, and variations of this process are practiced in fuel recovery.

In an effort to extend the electrometallurgical treatment process to oxide fuels, a process has been developed by researchers at Argonne National Laboratory to convert uranium oxide to metal as a front-end step to electrorefining. In this process, commonly referred to as oxide reduction or electrolytic reduction, declad and crushed uranium oxide fuel is loaded into a permeable steel cathode basket and immersed in a molten salt electrolyte of LiCl-Li$_2$O at 650° C. An electric potential is applied between the oxide fuel loaded cathode basket and an immersed platinum anode to electrochemically reduce the uranium, oxide to metal, thereby liberating its oxygen ions to the molten salt where they are simultaneously oxidized to oxygen gas at the anode. The reduced uranium oxide fuel is then amenable to the prescribed electrorefining process. Indeed, electrolytic reduction and electrorefining has been applied to used uranium oxide fuel, where refined uranium metal, devoid of fission products, has been successfully produced at bench, or small, scale. Applications of the oxide reduction process are currently being pursued, although this technique has not yet been deployed on a large scale for use with used uranium oxide fuels.

In light of the above-discussed, there is a need for a method to process uranium oxide fuels using a single molten salt system without converting uranium oxide to metal.

SUMMARY OF THE IN INVENTION

The Applicant has developed a novel method to detoxify used uranium oxide fuel by extracting transuranic and reactive fission products into molten salt. By contacting declad and crushed used uranium oxide fuel with a molten halide salt containing a minor fraction of the respective uranium trihalide, transuranic, including Pu, Np, Am and Cm, and reactive fission products, including Cs, Rb, Ba, Sr, Y, Nd, Ce, La, Pr, Sm, Eu, Gd, Te, Se, I and Br, partition from the fuel to the molten salt phase, while uranium oxide and non-reactive, or noble metal, fission products, including Zr, Mo, Ru, Pd, Tc and Rh, remain in an insoluble solid phase. The salt is then separated from the fuel via draining and distillation. By this method, the bulk of the decay heat (typically more than 99% for a nominal, used uranium oxide fuel), fission poisoning capacity (primarily from the lanthanide fission products), and radiotoxicity (particularly from Cs-137, Sr-90, I-129, and transuranic constituents) are removed from the used fuel. The remaining radioactivity from the noble metal fission products in the detoxified fuel is primarily limited to soft beta emitters, which are much easier to shield and thereby substantially simplifies subsequent handling, storage, treatment, disposal, or reuse of the fuel. The extracted transuranic and reactive fission products are amenable to existing technologies for group uranium/transuranic product recovery and fission product immobilization in engineered waste forms.

BRIEF DESCRIPTION OF THE DRAWINGS

The appended claims set forth those novel features which characterize the novel method for processing used uranium oxide fuel. However, the method itself, as well as further objects and advantages thereof, will best be understood with reference to the following detailed description of preferred embodiments taken in conjunction with the accompanying drawings, where like reference characters identify like elements throughout the various figures, in which:

FIG. 2 is a simplified schematic diagram illustrating the series of steps involved in carrying out the molten salt extraction process as well as the composition of the materials involved in the process.

DETAILED DESCRIPTION OF THE PREFERRED EMBODIMENTS

By contacting declad, i.e., the cladding which contains the uranium oxide fuel in an operating nuclear reactor and which has been separated from the uranium oxide fuel after removal from the reactor, and crushed used uranium oxide fuel with a molten halide salt containing a minor, or small, fraction of the respective uranium trihalide, e.g., LiCl—KCl—UCl$_3$ at 500° C., transuranic and reactive fission products partition from the fuel to the molten salt phase, while uranium oxide and non-reactive, noble metal fission products remain in an insoluble solid phase. The salt is then separated from the fuel via draining and distillation, after which the recovered salt may be returned to the molten salt pool for subsequent extractions.

Figure 1:
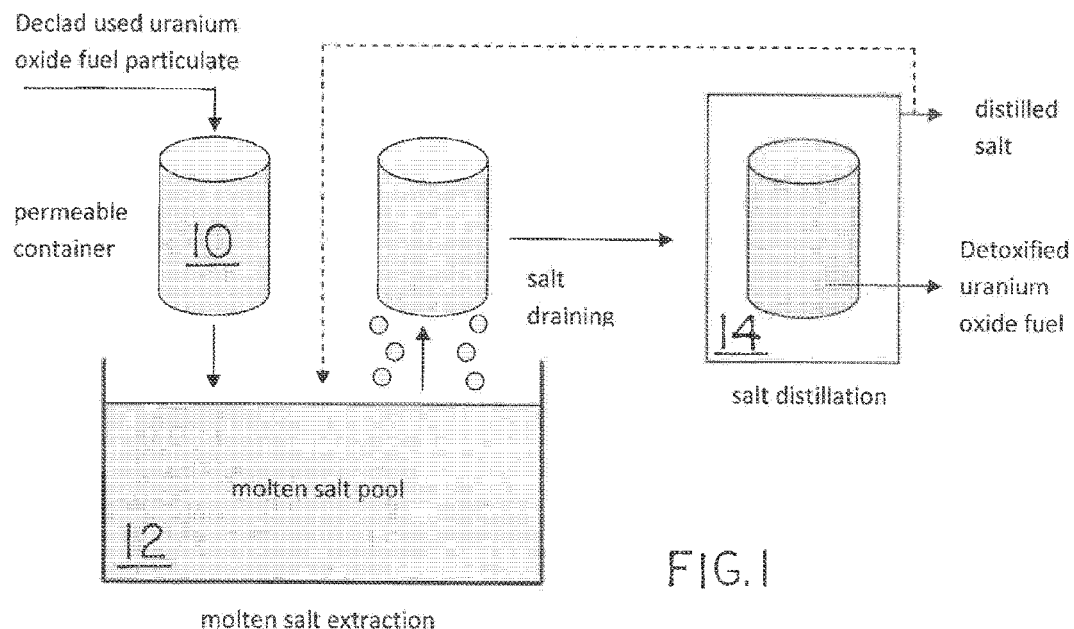
FIG. 1 is a simplified schematic diagram illustrating the series of steps involved in carrying out the molten salt extraction process.

A simplified flow diagram of this molten salt extraction technique, including salt draining and distillation, is shown in FIG. 1. A simplified diagram of this molten salt extraction technique as applied to a typical used uranium oxide fuel, i.e., from a light water reactor, is shown in FIG. 2. The percentage composition of a typical declad and crushed uranium oxide fuel, excluding oxygen, as well as the composition of the extracted fuel constituents and the composition of the fuel after molten salt extraction, is also shown in the latter figure. Particulate uranium oxide fuel together with the various transuranic and fission products are placed in a permeable container 10 which is lowered into a molten salt pool 12 containing a minor fraction of uranium trihalide for extraction of the transuranic and reactive fission products from the balance of the fuel components. This allows the molten salt to enter the permeable container 10 and contact the fuel for producing the exchange reaction, Transuranic and reactive fission products go into the salt phase and are free to disperse throughout the molten salt pool within and outside of the permeable container. Once the extraction is complete, the permeable container 10 is lifted out of the molten salt pool 12 with the uranium oxide fuel remaining in the permeable container together with the noble metal fission products and some residual salt. Some of the residual salt is then allowed to drain from the container 10. The container 10 is then placed in a closed system 14 to distill residual salt from the container under reduced pressure and elevated temperature, where the optimum pressure and temperature are determined using conventional means based upon the specific halide salt system being used. The distilled salt may then be returned to the molten salt pool 12 to further process additional used uranium oxide fuel. By this technique, the bulk of the decay heat, i.e., ≈99% for a typical used uranium oxide fuel, the fission poisoning capacity primarily from lanthanides, and the radiotoxicity primarily from Cs-137, Sr-90, I-129, and the transuranic constituents are removed from the used fuel. The remaining radioactivity from the noble metal fission products in the detoxified fuel is primarily limited to soft beta emitters, which are much easier to shield, thereby offering substantial advantages in terms of improved safety and reduced complexity and costs in subsequent handling, storage, treatment, disposal, or reuse of the uranium oxide fuel. Transuranic and reactive fission products that accumulate in the molten salt can be further processed to recover a group uranium/transuranic product and to dispose of fission product waste using existing technologies.

The molten salt extraction technique is based on the ability of uranium trihalides to preferentially exchange their halogen atoms in favor of oxygen atoms from transuranic and reactive fission products in used uranium oxide fuel to form uranium oxide and transuranic-reactive fission product halides per the following general reaction mechanism:

$$UM_3 + M_xO_y \rightarrow UO_2 + MX_2 \quad (2)$$

where:
X=halogen (fluorine, chlorine, bromine or iodine); and
M=transuranic or reactive fission product metals.

This mechanism is thermodynamically favored in the presence of UF$_3$, UCl$_3$, UBr$_3$ and The Gibbs free energies of formation ($\Delta G°_f$) for select mono-, di-, tri- and tetra-valent metal oxide reactions that are perceived to occur in a chloride system (accounting for charge balance in the respective reaction mechanisms) are shown in Table I. These Gibbs free energies represent the propensity that a particular reaction will occur, where the more negative the Gibbs free energy is, the more likely that particular reaction will spontaneously initiate and proceed to completion. Similar thermodynamic values are found for the respective reaction mechanisms in fluoride, bromide and iodide systems.

TABLE I

| Select Reaction Mechanisms in Chloride Phase | $\Delta G°_f$ at 500° C. (kJ) |
|---|---|
| 6 Cs$_2$O + 4 UCl$_3$ → 3 UO$_2$ + U +12 CsCl | −2999 |
| 6 SrO + 4 UCl$_3$ → 3 UO$_2$ + U + 6 SrCl$_2$ | −1242 |
| 2 Nd$_2$O$_3$ + 4 UCl$_3$ → 3 UO$_2$ + U + 4 NdCl$_3$ | −294 |
| PuO$_2$ + UCl$_3$ → UO$_2$ + PuCl$_3$ | −131 |

While the extractions discussed above could be performed solely in a molten uranium trihalide system, the addition of other like-halide salts assists in lowering the operating temperature of the molten salt system. For example, uranium trichloride (UCl$_3$) melts at 837° C., whereas a eutectic mixture of LiCl—KCl melts at 354° C. Thus, a minor fraction of UCl$_3$ (approximately 10 wt %) in LiCl—KCl eutectic, a commonly used molten salt electrolyte, could be used at 400-500° C. to effect the uranium oxide fuel extractions discussed above. The alkali (Li, Na, K, Rb, and Cs) halides are particularly useful in, lowering the melting point of a molten salt containing the respective uranium trihalide. Thus, a minor fraction of uranium trihalide (UF$_3$, UCl$_3$, UBr$_3$, or UI$_3$) in combination with one or more of the respective alkali halides (LiF, NaF, KF, RbF, CsF for a fluoride salt system, LiCl, NaCl, KCl, RbCl, CsCl for a chloride salt system, LiBr, NaBr, KBr, RbBr, CsBr for a bromide salt system, or LiI, NaI, KI, RbI, CsI for an iodide salt system) may be used to effect the uranium oxide fuel extractions discussed above, although the operating temperature will vary depending on the melting point of the chosen halide salt system. Typically, fluoride salts have higher melting points (m.p.) than those of chlorides, followed by those of bromides, then those of iodides, i.e., m.p. of fluoride salts>m.p, of chloride salts>m.p. of bromide salts>m.p, of iodide salts.

With reference again to FIG. 1, after the extraction of transuranic and reactive fission products from used uranium oxide fuel into a select molten salt system is complete, the permeable container 10 holding the detoxified uranium oxide particulate is lifted above the molten salt pool 12 whereupon residual molten salt is allowed to drain from the fuel particulate within the permeable container. The fuel-laden permeable container 10 is further removed from the molten salt extraction system and subjected to elevated temperature and reduced pressure within a closed system 14 to distill salt adhering to the fuel particulate and permeable container. The operating conditions for the salt distillation operation are dependent upon the chosen halide salt system. Typically, fluoride salts have a lower vapor pressure (P$_{vap}$) for a given temperature than those of chlorides, followed by those of bromides, then those of iodides, i.e., P$_{vap}$ of fluoride salts <P$_{vap}$ of chloride salts <P$_{vap}$ of bromide salts <P$_{vap}$ of iodide salts. Furthermore, the salt distillation operating conditions should be set to effect the removal of the transuranic and reactive fission product halides in addition to the removal of the extraction salt, i.e., uranium trihalide in combination with one or more of the respective alkali halide salts. Typically, barium and strontium halides exhibit the lowest vapor pressures amongst the transuranic, reactive fission product, and extraction salts. For example, $BaCl_2$ has vapor pressures of 64 and 352 mtorr at 1100 and 1200° C., respectively, while the vapor pressures of $SrCl_2$ are 16 and 95 mtorr at 1100 and 1200° C., respectively. Thus, to effectively distill fission products barium and strontium in addition to the extraction salt in a chloride system from detoxified uranium oxide fuel, the distillation operating pressure must be below 16 mtorr at 1100° C. or below 95 mtorr at 1200° C. After the residual salt has been distilled from the detoxified uranium oxide fuel, the distilled salt may be returned to the molten salt pool to support subsequent extractions.

The contacting of uranium trihalides with used uranium oxide fuel could also involve the formation of uranium oxyhalides per the following general reaction mechanism.

$$UX_3 + M_xO_y \rightarrow U_aO_bX_c + MX_z \qquad (3)$$

where:
X=halogen (fluorine, chlorine, bromine or iodine); and
M=transuranic or reactive fission product metals.

In this mechanism, the uranium trihalide ($UX_3$) incompletely exchanges its halogen atoms with oxygen atoms from transuranic/reactive fission products ($M_xO_y$) to form uranium oxyhalides ($U_aO_bX_c$) and transuranic/reactive fission product halides ($MX_z$). The uranium oxyhalides can be decomposed under an applied electric potential ($\geq 0.1$ V) or at elevated temperatures (such as those prescribed, above for the salt distillation system).

The reaction of uranium trihalides directly with uranium oxides could also lead to uranium oxyhalide formation per the following general reaction mechanism.

$$UX_3 + U_xO_y \rightleftharpoons U_aO_bX_c \qquad (4)$$

where: X=halogen (fluorine, chlorine, bromine or iodine).

This latter mechanism enables the exchange of uranium ions between the molten salt and the insoluble uranium oxide phases. Accordingly, the uranium-235 content of the uranium in the molten salt phase and the uranium-235 content of the uranium oxide fuel can blend. Thus, this mechanism provides some control of the uranium-235 content of the detoxified uranium oxide fuel based on the uranium-235 content of the uranium trihalide that is loaded into the molten salt extraction system. As discussed above, the uranium oxyhalide phase can be decomposed under an applied electric potential ($\geq 0.1$ V) or at elevated temperatures (such as those prescribed for the salt distillation system).

Figure 3:
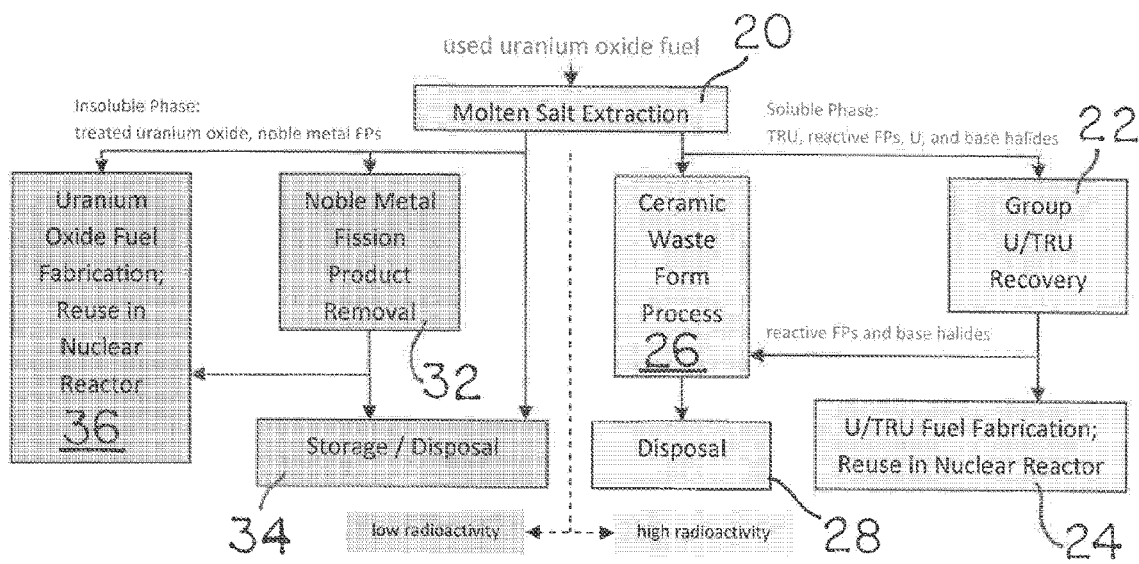
FIG. 3 is a summary flow sheet of possible alternatives after separation of the various uranium oxide fuel components following the molten salt extraction process.

Referring to FIG. 3, there is shown in the form of a flow sheet the various possible alternatives in the sequential stepwise handling and treatment of uranium oxide fuel and transuranic and reactive fission products available in the molten salt extraction method of the present invention. The molten salt extraction of transuranic and reactive fission products from used uranium oxide fuel offers a variety of benefits regarding subsequent handling, storage, treatment, disposal, or reuse of the fuel and its constituents in both the soluble (molten salt) and insoluble (uranium oxide and noble metal fission products) phases. With reference first to the soluble (molten salt) phase, the extraction of transuranic and reactive fission products at step 20 into a molten halide salt containing a minor fraction of the respective uranium trihalide allows for subsequent separation and recovery of transuranics along with uranium in a group uranium/transuranic metal product recovered at step 22 using existing technologies. The group uranium/transuranic metal product could be fabricated into reactor fuel at step 24, particularly for fast reactors where transuranic constituents are burned. The molten salt, with or without group uranium/transuranic recovery, is also amenable to stabilization in an engineered ceramic waste form at step 26 for disposal as shown at step 28.

Devoid of transuranic and reactive fission products via molten salt extraction at step 20, subsequent handling of the insoluble (treated uranium oxide and noble metal fission products) phase is substantially simplified by the predominant absence of decay heat, fission poisoning capacity, and radiotoxicity. Thus, subsequent storage, disposal, treatment, or reuse of the treated fuel could be performed with substantially less shielding and fewer radiological controls. The treated fuel could be stored or disposed of at step 34. The treated fuel could also be subjected to additional processing at step 32 to remove noble metal fission products, as needed, for subsequent storage or disposal of the fuel at step 34. For example, the removal of technetium-99 could render the treated uranium oxide fuel acceptable for near-surface disposal, as opposed to deep geological disposal that is required for spent fuel. Furthermore, additional processing to remove noble metal fission products from the treated uranium oxide fuel at step 32 could include recovery of valuable platinum, group metals, i.e., Ru, Pd, Rh. With or without additional processing for noble metal removal, the treated uranium oxide fuel could be fabricated into fuel for reuse in a nuclear reactor at step 36. Given a nominal uranium-235 content of 1% in used uranium oxide fuel, the treated uranium oxide could be fabricated into fuel without any adjustment in uranium-235 content for reuse in, a heavy water reactor. With upblending, or enriching, of uranium-235 to a nominal 3-5% enrichment, the treated uranium oxide could be fabricated into fuel for reuse in a light water reactor at step 36. Upblending of uranium-235 in the treated uranium oxide fuel could occur via the molten salt extraction process 20, i.e., using a higher uranium-235 content in the respective uranium trihalide, or subsequent to the molten salt extraction process, i.e., using a separate, higher uranium-235 enrichment uranium blend material.

A benefit of the molten salt extraction process is its application to short decay fuels, e.g., less than, one year after removal from a reactor, given the resistance of molten salts to radiolytic decomposition. In contrast, conventional aqueous processing, e.g., Plutonium Uranium Extraction (PUREX), requires used uranium oxide fuels to decay for several years prior to processing to limit radiolytic decomposition of its aqueous and organic media. Furthermore, the absence of the hydrogenous media in the molten salt extraction process lessens criticality concerns, thereby enabling higher actinide densities and lower operating volumes for a given throughput of used fuel. Alternately, the molten salt extraction process could serve as a front-end process to aqueous processing, which could be applied for residual fission product removal from detoxified uranium oxide fuel.

In summary, a new technique has been defined to detoxify used uranium oxide fuel by extracting transuranic and reactive fission products into a soluble molten salt phase, leaving uranium oxide and noble metal fission products in an insoluble solid phase that can be subsequently separated from the salt via draining and distillation. The molten salt extraction technique is based on the ability of uranium trihalides to preferentially exchange their halogen atoms in favor of oxygen atoms from transuranic and reactive fission product halides. While this technique has been demonstrated in bench-scale experiments with used uranium oxide fuel in molten LiCl—KCl—$UCl_3$ at 500° C., this technique might function at lower temperatures in other halide salt systems, including other chloride, fluoride, bromide, or iodide base salts with a minor, or small, fraction of the respective uranium trihalide. The molten salt extraction technique offers potential benefits regarding the subsequent handling, storage, treatment, disposal, or reuse of used uranium oxide fuel, including recycle into nuclear fuels.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed:

1. A method for detoxifying used uranium oxide fuel containing transuranic and reactive fission products and non-reactive noble metal fission products without converting the uranium oxide fuel to uranium metal, said method comprising the steps of:
   decladding and crushing the used uranium oxide fuel to particulate form;
   contacting the used particulate uranium oxide fuel with a molten halide salt containing a small portion of uranium trihalide, wherein the molten halide salt and the uranium trihalide contain the same halide, and wherein the transuranic and reactive fission products partition from the uranium oxide fuel to the molten halide salt phase, with said non-reactive noble metal fission products remaining with the uranium oxide fuel in an insoluble solid phase; and
   separating the uranium oxide fuel and non-reactive noble metal fission products from the molten halide salt containing the transuranic and reactive fission products.

2. The method of claim 1, wherein the step of separating the insoluble uranium oxide fuel and non-reactive noble metal fission products from the molten salt includes draining and distilling the molten salt containing the transuranic and reactive fission products from the uranium oxide fuel and non-reactive noble metal fission products.

3. The method of claim 2, wherein the distilling of the molten salt containing transuranic and reactive fission products from the uranium oxide fuel and non-reactive noble metal fission products occurs at reduced pressure and elevated temperature.

4. The method of claim 1, wherein the extraction of the transuranic and reactive fission products by contacting the used uranium fuel oxide with a molten halide salt is initiated spontaneously and proceeds to completion.

5. The method of claim 1, wherein the molten halide salt contains of 10 wt. % uranium trihalide.

6. The method of claim 5 wherein the step of separating the uranium oxide fuel and non-reactive noble metal fission products from the molten salt includes reducing the pressure applied to, and increasing the temperature applied to, the molten halide salt.

7. The method of claim 1, wherein said uranium trihalide is $UF_3$, $UCl_3$, $UBr_3$ or $UI_3$, and said molten halide salt contains one or more of the respective alkali halides, LiF, NaF, KF, RbF, CsF for a molten fluoride salt system, LiCl, NaCl, KCl, RbCl, CsCl for a molten chloride salt system, LiBr, NaBr, KBr, RbBr, CsBr for a molten bromide salt system, or LiI, NaI, KI, RbI, CsI for a molten iodide salt system.

8. The method of claim 1 further comprising the step of adding an alkali halide eutectic to the molten uranium trihalide to reduce the temperature required for extracting the transuranic and reactive fission products from uranium oxide fuel.

9. The method of claim 1, wherein uranium oxyhalides form upon contacting the used uranium oxide fuel with the molten halide salt, with the method further comprising the step of applying an electric potential to said uranium oxyhalides or increasing the temperature of the uranium oxyhalides for converting the uranium oxyhalides to uranium oxide and uranium trihalide.

10. The method of claim 9, wherein the applied electric potential is at least 0.1 volt.

11. The method of claim 9, wherein the uranium oxyhalides are heated to a temperature in the range of 1100-1200° C.

12. The method of claim 1, wherein the used uranium oxide fuel and the uranium trihalide include uranium-235 ions, and wherein the uranium-235 ions in the insoluble solid phase and the uranium-235 ions in the molten halide salt phase are free to exchange resulting in blending of uranium isotopic compositions between the insoluble solid phase and the molten halide salt phase.

13. The method of claim 1 further comprising the step of separating and recovering transuranics together with uranium from the molten halide salt phase in a group uranium/transuranic metal product capable of fabrication into a nuclear reactor fuel.

14. The method of claim 1 further comprising the step of converting the molten halide salt containing the reactive fission products with or without the transuranic elements to a stabilized ceramic waste form for disposal.

15. The method of claim 12 further comprising the step of increasing uranium-235 content of the uranium trihalide in the molten halide salt for upblending the uranium-235 content of the uranium oxide fuel.

16. A method for processing spent uranium oxide fuel for storage, disposal or reuse in a nuclear reactor, wherein the spent uranium oxide fuel includes transuranic and reactive fission products, said method comprising the steps of:
   decladding and crushing the spent uranium oxide fuel to particulate form;
   contacting the crushed, decladded spent uranium oxide fuel with a molten halide salt containing a small portion of uranium trihalide at an elevated temperature, wherein the tranuranic and reactive fission products partition from the spent uranium oxide fuel to the molten halide salt; and
   drying the spent uranium oxide fuel and molten halide salt to remove transuranic and reactive fission products from the spent uranium oxide fuel prior to storing, disposing of or reusing the processed uranium oxide fuel.

17. The method of claim 16, wherein the processed spent uranium oxide fuel is adapted for use in a heavy water nuclear reactor.

18. The method of claim 16 further comprising the step of enriching the processed spent uranium oxide fuel with uranium-235 by providing the molten halide salt with uranium-235 for rendering the processed spent uranium oxide fuel usable in a light water reactor.

19. The method of claim 16, wherein said spent uranium oxide fuel is characterized as having a short decay period, and wherein said method enables a subsequent step of aqueous processing of the spent uranium oxide fuel for removal of residual fission products from the spent uranium oxide fuel.

20. The method of claim 16, wherein said reactive fission products include Cs, Rb, Ba, Sr, yttrium, Nd, Ce, La, Pr, Sm, Eu, Gd, Np, Pu, Am, Cm, Te, Se, and I, Br.

21. The method of claim 20, wherein said reactive fission products partition to a salt phase as anions in said molten halide salt.

22. The method of claim 16, wherein said uranium trihalide is $UF_3$, $UCl_3$, $UBr_3$ or $UI_3$, and said molten halide salt contains one or more of alkali halides, LiF, NaF, KF, RbF, CsF for a molten fluoride salt system, LiCl, NaCl, KCl, RbCl, CsCl for a molten chloride salt system, LiBr, NaBr, KBr, RbBr, CsBr for a molten bromide salt system, or LiI, NaI, KI, RbI, CsI for a molten iodide salt system.

23. The method of claim 16, wherein the step of contacting the crushed, decladded spent uranium oxide fuel includes loading the crushed decladded spent uranium oxide fuel into a closed permeable basket and immersing said closed permeable basket in the molten halide salt at a temperature greater than the melting point of the halide salt.

24. The method of claim 16, wherein the spent uranium oxide fuel is a short decay fuel.

25. The method of claim 16, wherein said spent uranium oxide fuel further includes noble metal fission products, and wherein said noble metal fission products include Zr, Mo, Ru, Pd, Tc or Rh and remain in an insoluble solid phase with the spent uranium oxide fuel following separation of the transuranic and reactive fission products from the uranium oxide fuel.

* * * * *